(12) United States Patent
Döbler

(10) Patent No.: US 10,391,688 B2
(45) Date of Patent: Aug. 27, 2019

(54) METHOD FOR TRANSFERRING BOTTOM LABELS AND WRAPAROUND LABELS INTO AN INJECTION MOULD AND DEVICE, SUITABLE FOR THIS PURPOSE, FOR PRODUCING INJECTION-MOULDED PARTS PROVIDED WITH BOTTOM LABELS AND WRAPAROUND LABELS

(71) Applicant: SONOCO DEVELOPMENT INC., Hartsville, SC (US)

(72) Inventor: Daniel Döbler, Münsingen-Dottingen (DE)

( * ) Notice: Subject to any disclaimer, the term of this patent is extended or adjusted under 35 U.S.C. 154(b) by 117 days.

(21) Appl. No.: 15/304,407

(22) PCT Filed: Apr. 13, 2015

(86) PCT No.: PCT/EP2015/000767
§ 371 (c)(1),
(2) Date: Jan. 3, 2017

(87) PCT Pub. No.: WO2015/158423
PCT Pub. Date: Oct. 22, 2015

(65) Prior Publication Data
US 2017/0036380 A1  Feb. 9, 2017

(30) Foreign Application Priority Data
Apr. 17, 2014  (DE) .......................... 10 2017 005 659

(51) Int. Cl.
*B29C 31/00* (2006.01)
*B29C 45/14* (2006.01)
(Continued)

(52) U.S. Cl.
CPC ...... *B29C 45/14008* (2013.01); *B29C 65/008* (2013.01); *B29C 65/48* (2013.01);
(Continued)

(58) Field of Classification Search
CPC ................. B29C 2045/14057; B29C 2045/14106; B29C 2045/14155; B29C 2045/14926;
(Continued)

(56) References Cited

U.S. PATENT DOCUMENTS

| 4,323,411 A | * | 4/1982 | Uhlig | ...................... B29C 49/18 156/244.14 |
| 5,053,101 A | | 10/1991 | Dromigny | |

(Continued)

FOREIGN PATENT DOCUMENTS

| EP | 2332712 A1 | 6/2011 |
| JP | 2012 091850 A | 5/2012 |

(Continued)

OTHER PUBLICATIONS

Translation of written opinion of WO2015/158423.*

(Continued)

*Primary Examiner* — Sonya M Sengupta
(74) *Attorney, Agent, or Firm* — McCarter & English, LLP; Jill Ann Mello

(57) ABSTRACT

A method is proposed for transferring a bottom label and a wraparound label into an injection mould for producing an injection-moulded part provided with the labels, in that the bottom label is arranged on the end side and the wraparound label on the lateral side of an insert die and the insert die equipped with the two labels is introduced into the mould cavity of the moulding tool, after which the bottom label is deposited on the bottom and the wraparound label on the lateral surface of the mould cavity of the moulding tool, in order to back-mould them with a plastics material injected into the mould cavity. According to the invention, the method comprises the following steps of:—providing an insert die, the end side of which has a central portion and a (Continued)

Figure 4:
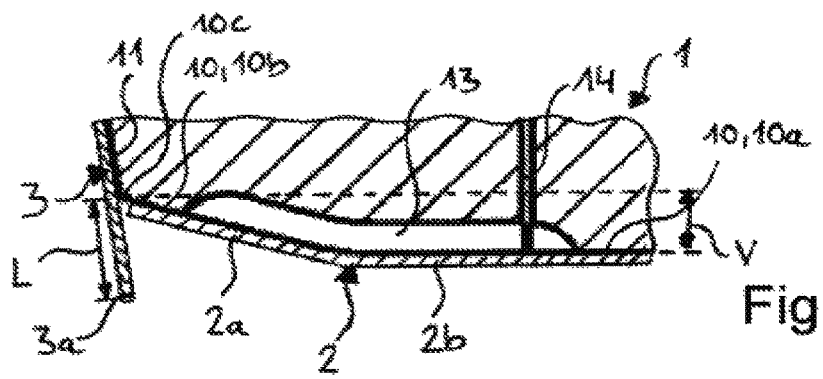

circumferential portion adjoining the central portion radially on the outside, wherein the central portion protrudes further in the direction of the free end of the insert die in the axial direction of the latter than the circumferential portion, such that the cross section of the insert die narrows in the direction of its free end, at least in the circumferential portion of its end side;—applying the bottom label both to the central portion and to the circumferential portion of the end side of the insert die and applying the wraparound label to the lateral side thereof such that the wraparound label projects beyond the end, fining the end side, of the lateral side of the insert die in the direction of the free end thereof;—introducing the insert die equipped with the two labels into the mould cavity of the moulding tool;—detaching the wraparound label from the lateral side of the insert die and applying same at least to the lateral surface of the mould cavity of the moulding tool;—detaching the bottom label from the end side of the insert die and applying same to the bottom of the mould cavity of the moulding tool, wherein the peripheral region of the bottom label is turned down from the circumferential portion of the end side of the insert die onto the bottom of the mould cavity of the moulding tool, such that it internally overlaps the edge, facing it, of the wraparound label; and—extracting the insert die from the mould cavity of the moulding tool. The invention also relates to an injection-moulding device, suitable for carrying out such a method, having an insert die of the abovementioned type.

15 Claims, 2 Drawing Sheets

(51) Int. Cl.
  *B29C 65/00* (2006.01)
  *B29C 65/48* (2006.01)
  *B29L 31/00* (2006.01)
(52) U.S. Cl.
  CPC .. *B29C 31/008* (2013.01); *B29C 2045/14057* (2013.01); *B29C 2045/14106* (2013.01); *B29C 2045/14155* (2013.01); *B29C 2045/14926* (2013.01); *B29L 2031/744* (2013.01)
(58) Field of Classification Search
  CPC ............ B29C 31/008; B29C 45/14008; B29C 65/008; B29C 65/48; B29C 2031/744
  See application file for complete search history.

(56) References Cited

U.S. PATENT DOCUMENTS

| | | | |
|---|---|---|---|
| 5,350,483 | A | 9/1994 | Yager et al. |
| 5,916,646 | A * | 6/1999 | Baudin ................... B29C 49/24 215/12.1 |
| 2005/0016659 | A1* | 1/2005 | Hoogland ......... B29C 45/14008 156/73.1 |
| 2005/0287241 | A1 | 12/2005 | Rudolph |
| 2009/0026221 | A1 | 1/2009 | Fernandez De Mendiola Quintana |
| 2010/0186892 | A1* | 7/2010 | Blitshteyn ............. B29C 31/008 156/273.1 |

FOREIGN PATENT DOCUMENTS

| | | | |
|---|---|---|---|
| JP | 2014046 979 A | | 3/2014 |
| WO | 2008/143868 A1 | | 11/2008 |

OTHER PUBLICATIONS

Translation of EP2332712.*
Translation of JP2012-091850.*
Translation of JP2014-046979.*
International Search Report for International Application No. PCT/EP2015/000767, dated Jul. 23, 2015 (2 pages).
English Abstract of CL Patent Application 201300504 (Wenco S.A.) filed Jul. 5, 2013.
Anatolyevich, Pneumatic Vacuum Molding. pp. 57-59, (2010).
Russian Office Action for Application No. 2016144760/05, dated Oct. 19, 2018, 9 pages.

* cited by examiner

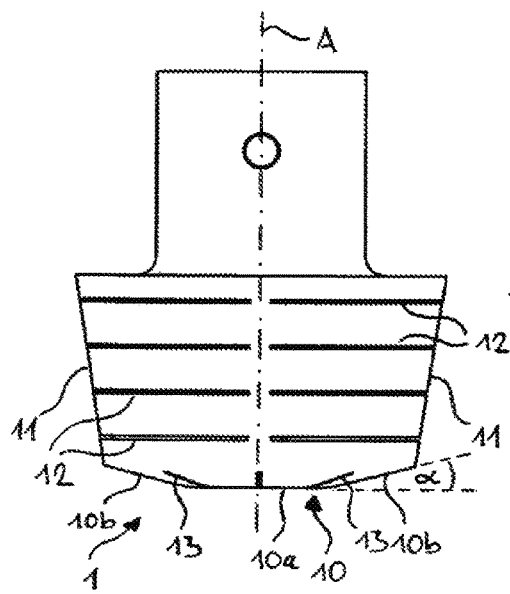
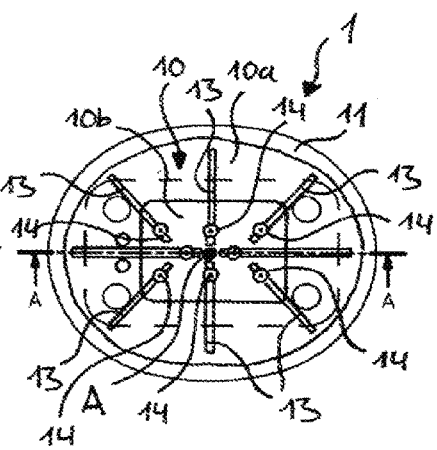
Fig. 1  Fig. 2
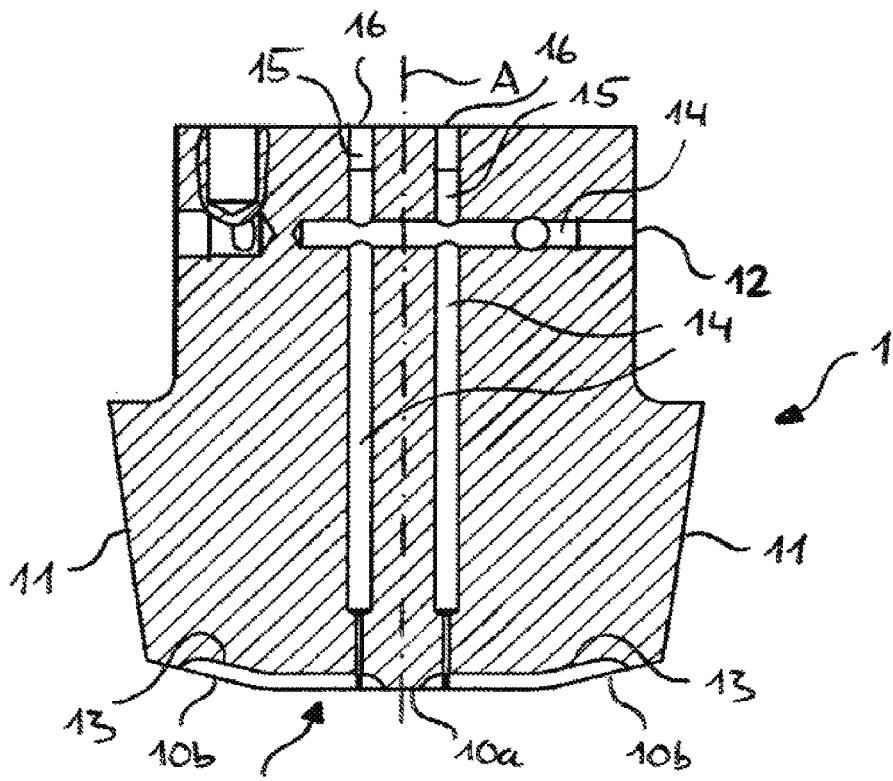
Fig. 3

METHOD FOR TRANSFERRING BOTTOM LABELS AND WRAPAROUND LABELS INTO AN INJECTION MOULD AND DEVICE, SUITABLE FOR THIS PURPOSE, FOR PRODUCING INJECTION-MOULDED PARTS PROVIDED WITH BOTTOM LABELS AND WRAPAROUND LABELS

The invention relates to a method for transferring a bottom label and a wraparound label into an injection mould for producing an injection-moulded part provided with the bottom label and with the wraparound label, in particular in the form of a container, in that the bottom label is arranged on the end side of an insert die and the wraparound label on the lateral side of an insert die, and the insert die equipped with both the bottom label and with the wraparound label is introduced into the mould cavity of a moulding tool, after which the bottom label is deposited on the bottom of the mould cavity of the moulding tool and the wraparound label is deposited on the lateral surface of the mould cavity of the moulding tool in order to back-mould them with a plastics material. The invention further relates to a device that is particularly suitable for carrying out such a method, for producing an injection-moulded part provided with a bottom label and with a wraparound label, in particular in the form of a container, with a moulding tool that has a mould cavity comprising a bottom and a lateral surface and with an insert die that can be introduced into the mould cavity of the moulding tool and which has an end side which is suitable for applying the bottom label to the latter, and with a lateral side which is suitable for applying the wraparound label to the latter.

In many cases it is desirable to provide plastic moulded parts produced by injection moulding, such as for example containers used for the packaging of everyday and luxury food products and the like, with both a bottom and a wraparound label. The latter can serve, e.g. in the manner of a barrier layer, to increase the diffusion density of the plastic container or also purely as a base for printed text identifying the packaged item so that it is not necessary to subsequently apply labels to the finished moulded part. The production of injection-moulded parts provided with labels of this type generally takes place by the label being introduced into the mould cavity of an injection moulding tool, after which it is back-moulded with the plasticized plastic material. After the plastic material has solidified, the injection-moulded part to which the label permanently adheres can be removed from the moulding tool. Such methods are also referred to as "IML (In-Mould-Labeling) methods".

If the moulded part is to be provided with a bottom label as well as with a wraparound label, as is often the case in particular with packaging containers in the form of cups, bowls or the like, the precise positioning of the labels in the mould cavity of the moulding tool proves to be relatively complicated. For this purpose, it is generally first of all the bottom label that is applied to the bottom of the mould cavity, and then the wraparound label is applied to the lateral surface of the mould cavity of the moulding tool, and this often takes place by means of an insert die which is shaped so as to complement the mould cavity of the moulding tool, and for this reason enables precise positioning of the respective label. However, it proves to be particularly disadvantageous that in order to insert the bottom and the wraparound label into the moulding tool one after the other in this way, two punching strokes are required which in addition, respectively, on the one hand require application of the bottom label, and on the other hand application of the wraparound label to the end side or to the lateral side of the insert die by appropriate transfer devices. Consequently, in this way only comparably poor cycle times can be achieved.

The same applies to the method known from JP 2012-091850 A for producing an injection-moulded packaging container that is provided with a wraparound label and with a bottom label overlapping the latter internally and adhered to it in the overlap region. According to the production method the flat wraparound label, the length of which is greater than the circumference of the lateral surface of the container to be coated with the latter, is first of all bent into a cylinder and the cylindrically bent wraparound label is applied to the circumferential surface of an open moulding tool so that it adjoins a protrusion on the bottom of the moulding tool, and its cylindrical bent sides facing one another overlap due to the length of the wraparound label being greater than the circumference of the container. The bottom label is then applied to the bottom of the moulding tool by means of a die such that the circumferential region of the bottom label overlaps the lower portion of the wraparound label facing it on the inside, the bottom label being adhered to the wraparound label in this overlap region. A fusible thermoplastic is then injected into the moulding tool in order to back-mould the bottom and the wraparound label such as to form the finished container.

U.S. Pat. No. 5,053,101 describes a generic device for producing injection-moulded parts in the form of containers that are provided with a bottom label as well as with a wraparound label. The device comprises an insert die with a planar end side and an approximately cylindrical or slightly conical lateral side which are shaped complementarily in relation to the mould cavity of an injection-moulding tool. The insert die is equipped both on the end side and on the lateral side with suction devices which serve to equip the insert die at the same time with both a bottom and with a wraparound label which are removed from a respective magazine by appropriate transfer devices. In this way it is possible to transfer both labels into the mould cavity of the moulding tool and to apply them here with a single stamping stroke. However, it is a particular disadvantage of this type of device on the one hand that covering of the entire surface of the moulded part with the bottom label and the wraparound label cannot be achieved because a collision occurs in the region where the two labels come into contact, at the latest when depositing said labels in the mould cavity of the moulding tool, unless the dimensions of the two labels are chosen such that a gap remains between them. However, not only is this gap visible, and so unattractive, on the finished moulded part, but it may also lead to the plasticized plastic material passing between the two labels onto the (subsequently) outer side of the moulded part during the back-moulding of the labels, and this in turn results in a considerable amount of waste.

Similar methods for producing a packaging container provided with a bottom label as well as with a wraparound label can be gathered from JP 2014-046979 A, once again on the one hand the flat wraparound label having a length which is greater than the circumference of the lateral surface of the container to be coated with said label so that its ends facing one another overlap when it has been bent into a cylinder and has been applied to the circumferential surface of an open moulding tool. On the other hand the bottom label has a larger circumference than the bottom of the container so that the latter overlaps the wraparound label at the edge. The introduction of the bottom label and the wraparound label into the injection-moulding tool takes place either —similarly to the aforementioned JP 2012-091850 A —one after the other by means of one or more dies that can be introduced into the tool and to which negative pressure is applied, or —similarly to U.S. Pat. No. 5,053,101 A described above —both the bottom label and the wraparound label are applied to one and the same die and are transferred into the moulding tool at the same time, the problem mentioned above in connection with U.S. Pat. No. 5,053,101 of a collision between the two labels then occurring once again at the latest when they are deposited together in the moulding tool so that they can then be back-moulded with a plasticized plastic.

One can gather from EP 2 332 712 B1 a method for the insertion of a bottom label and a wraparound label into the mould cavity of an injection-moulding tool and an insert die appropriate for this purpose, which overcome the aforementioned problem by the two labels overlapping one another being deposited in the mould cavity by means of a single punching stroke. In this connection the bottom label in particular is placed in the mould cavity such that it overlaps the circumferential edge of the wraparound label facing it at the edge on the inside so that not only is it possible to cover the entire surface of the injection-moulded part with the label, but also when injecting the plasticized plastic material into the mould cavity of the moulding tool, first of all the bottom label is back-moulded, and then the molten plastic comes into contact with the wraparound label beyond the bottom label so that the wraparound label is also back-moulded. In this way the molten plastic can be reliably prevented from passing between the labels onto the (subsequently) outer and visible side of the moulded part. A disadvantage, however, is the extreme complexity of the insert die which has an outer die for receiving the wraparound label and an inner die for receiving the bottom label, the inner die being axially displaceable relative to the outer die. Both die parts have a shape that is complementary to the mould cavity of the moulding tool, the inner die in turn having a planar end side for receiving the bottom label, and the outer die having an approximately cylindrical or slightly conical lateral side for receiving the wraparound label. Moreover, both die parts are provided with suction devices. The insertion of the insert die equipped both with a bottom label and with a wraparound label takes place by means of a single punching stroke, but after introducing the insert die into the mould cavity of the moulding tool the wraparound label must first of all be deposited on the lateral surface of the mould cavity, after which the inner die provided with the bottom label must be moved out of the outer die so as to also deposit the bottom label on the bottom of the mould cavity such that it overlaps the (lower) edge of the wraparound label facing it on the inside. This can likewise lead to extended cycle times.

Therefore, the object of the invention is to further develop a method for transferring a bottom label as well as a wraparound label into an injection mould in order to produce an injection-moulded part provided with the bottom label and with the wraparound label of the type specified at the start as well as a device, particularly suitable for implementing such a method, for producing an injection-moulded part of the type specified at the start provided with a bottom label and with a wraparound label easily and inexpensively, such that the aforementioned disadvantages can at least partially be overcome while guaranteeing the fastest possible cycle times.

From a technical point of view, this object is achieved by a method of the type specified at the start which comprises the following steps:

providing an insert die, the end side of which has a central portion and a circumferential portion adjoining the central portion radially on the outside, wherein the central portion protrudes further in the direction of the free end of the insert die in the axial direction of the latter than the circumferential portion, such that the cross-section of the insert die narrows in the direction of its free end, at least in the circumferential portion of its end side;

applying the bottom label both to the central portion and to the circumferential portion of the end side of the insert die and applying the wraparound label to the lateral side of the insert die such that the wraparound label projects beyond the end, facing the end side of the insert die, of the lateral side of the insert die in the direction of the free end thereof;

introducing the insert die equipped with the bottom label and with the wraparound label into the mould cavity of the moulding tool;

detaching the wraparound label from the lateral side of the insert die and applying the same at least to the lateral surface of the mould cavity of the moulding tool;

detaching the bottom label from the end side of the insert die and applying the same to the bottom of the mould cavity of the moulding tool, wherein the peripheral region of the bottom label is turned down from the circumferential portion of the end side of the insert die onto the bottom of the mould cavity of the moulding tool, such that it internally overlaps the edge, facing it, of the wraparound label; and extracting the insert die from the mould cavity of the moulding tool.

In order to resolve the problem underlying the invention, with a device of the type specified at the start the invention makes provision, moreover, such that the end side of the insert die has a central portion and a circumferential portion adjoining the central portion radially on the outside, wherein the central portion protrudes further in the direction of the free end of the insert die in the axial direction of the latter than the circumferential portion, such that the cross-section of the insert die narrows in the direction of its free end, at least in the circumferential portion.

The design of the invention makes it possible, with an insert die designed to be very simple and inexpensive, robust and not requiring maintenance, to transfer both the bottom label and the wraparound label into the moulding tool by means of a single punching stroke, while at the same time guaranteeing precise positioning, the label then being able to be back-moulded such as to form the plastic moulded part. Due to the backward offset on the circumference side of the end side of the insert die receiving the bottom label with respect to the central portion of the end side of the insert die, at least the circumferential edge of the bottom label is reshaped upwardly if it is applied to the end side of the insert die. In this way, any collision with the wraparound label is reliably prevented, which wraparound label is on its part applied to the lateral side of the insert die such that it projects downwards over the latter, i.e. in the direction of the end side, free end of the insert die. Consequently, upon introducing the insert die equipped both with the bottom label and with the wraparound label into the mould cavity of the moulding tool, the wraparound label passes into the desired position on the lateral surface of the mould cavity, its lower, free edge passing downwards along the lateral surface of the mould cavity of the moulding tool, possibly to the circumferential edge of the bottom of the mould cavity (depending on how far the lower edge of the wraparound label projects downwardly over the lateral side of the insert die in the direction of its free end) and is thus located beneath the bottom label, the circumferential edge of which, being bent upwards, rests against the circumferential portion of the end side of the insert die. If the labels are now detached from the insert die, the circumferential edge of the bottom label turns downwards from the circumferential portion of the end side of the insert die towards the bottom of the mould cavity of the moulding tool and thus automatically overlaps the (lower) circumferential edge of the wraparound label on the inside of the mould cavity so that covering of the whole surface of the moulded part can be achieved without a gap being formed between the two labels through which the plasticized polymer could pass after being injected into the mould cavity. Due to the overlap on the inside (i.e. in the finished moulded part the edge of the wraparound label facing the bottom label lies above the edge of the bottom label facing the wraparound label on the bottom label), during the normal injection of the molten plastic into a central bottom region of the mould cavity of the moulding tool it is furthermore ensured that the plasticized polymer can flow beyond the labels resting against one another peripherally without passing between the labels.

In an advantageous embodiment of the method according to the invention provision can be made such that the wraparound label is applied to the lateral side of the insert die such that it projects over its lateral side in the direction of the free end of the insert die by a distance that corresponds at least to the axial offset between the central portion of the end side of the insert die protruding the furthest in the axial direction in the direction of the free end of the insert die and the outer circumference of the circumferential portion of the end side of the insert die or at least slightly exceeds this axial offset. In this way a sufficiently overlapping arrangement of the bottom label on the inside of the mould cavity of the moulding tool above the wraparound label is guaranteed, the desired degree of overlapping basically being pre-set easily by the protrusion with which the wraparound label projects over the lateral side of the insert die in the direction of its end side free end when it is applied to the lateral side of the insert die.

The bottom label should preferably be applied substantially to the entire end side of the insert die, including its circumferential portion, it having to be applied at least over a circumferential part of the circumferential portion of the insert die in order to be deformed upwardly and in order to be able to be "turned downwards" when inserted into the mould cavity of the moulding tool. However, even when the bottom label is somewhat smaller than the entire end side of the insert die and only extends over part of its receding circumferential section, this can be compensated by a further protrusion of the wraparound label from the lateral side of the insert die in the direction of the end side without necessarily having to use an insert die with a different geometry. In this case the overlap region of the labels "migrates" from a lower lateral portion of the moulded part in the direction of its bottom. Consequently, a single insert die can be used for similar blanks of the bottom label and the wraparound label.

As regards the design of the moulding tool of a device according to the invention, the bottom of the mould cavity of the moulding tool can have, for example, a substantially planar extension, as is normal in particular in the case of producing injection-moulded containers in order to provide good stability of the containers. Instead, however, it is of course also possible —in so far as is desired —for the bottom of the mould cavity of the moulding tool on its part to be made, for example, in the form of a trough and to have a circumferential region extending from a central region on the circumferential side obliquely upwards, one only needing to ensure that the axial distance between the lowest point of the central region of the bottom of the mould cavity and the outer circumference of its circumferential region is smaller than the axial offset between the central portion of the end side of the insert die protruding the furthest in the axial direction in the direction of the free end of the insert die and the outer circumference of the circumferential portion of the end side of the insert die, so that the bottom label can be "turned downwards" onto the bottom of the mould cavity and overlapping the wraparound label on the periphery when depositing it on the bottom of the mould cavity on the circumferential side of the circumferential portion of the end side of the insert die. In other words, any curvature or conicity of the bottom of the mould cavity of the moulding tool must be smaller than the curvature or conicity of the end side of the insert die.

Moreover, it can prove to be advantageous if the cross-over between the lateral surface of the mould cavity of the moulding tool and its bottom are rounded, the rounding having in particular a radius of at least 1 mm, preferably of at least 2 mm. In this way it is easily possible to push the wraparound label over the lateral surface of the mould cavity into a circumferential portion of the bottom of the mould cavity of the moulding tool with its edge facing the bottom label (projecting over the lateral side of the insert die) depending on the desired protrusion with which it has been applied to the lateral side of the insert die projecting in the direction of its end side, free end, it being able to be reshaped or bent cleanly along the rounded cross-over between the lateral surface and the bottom of the mould cavity without striking the bottom and blocking or being damaged here.

As regards the geometric design of the insert die, first of all its lateral side can be formed in a known way to be substantially complementary to the lateral surface of the mould cavity of the moulding tool so as to provide simple and precise positioning of the wraparound label in the mould cavity when the latter is deposited. The lateral side of the insert die can basically be of practically any form here and e.g. be substantially in the form of a cylinder jacket (not necessarily circular cylindrical), its cross-section in the region of its lateral side being able to be made to be e.g. circular, oval, polygonal or the like, and being able to narrow at least slightly in particular in the direction of its end side in order to provide simple de-moulding of the finished moulded part in the conventional manner.

The end side of the insert die, which according to the invention has a central portion and a circumferential portion adjoining the central portion radially on the outside, the central portion protruding further in the axial direction of the insert die in the direction of its free end than the circumferential portion so that the cross-section of the insert die narrows in the direction of its free end, at least in the circumferential portion of its end side, can, for example, be substantially convexly curved and have a flowing cross-over of its central portion into its circumferential portion. Instead, it can also be advantageous if the central region of the end side of the insert die is substantially planar in form (in this respect e.g. approximately complementary to the corresponding bottom portion of the mould cavity of the moulding tool if the insert die has been shifted into the latter), and the circumferential portion adjoining the latter radially on the outside narrows substantially conically or is curved convexly. Needless to say, other configurations are conceivable provided the cross-section of the insert die narrows in the direction of its free end, at least in the circumferential portion of its end side, so that the end side of the insert die recedes on the circumferential side in relation to its central portion.

As known as such from the prior art mentioned at the start, in an advantageous embodiment of the method according to the invention provision can be made such that in order to apply the bottom label to the end side of the insert die, said bottom label is sucked at least onto the circumferential portion of the end side of the insert die, in particular both onto the circumferential portion and onto the central portion of the end side of the insert die. Moreover, in order to apply the wraparound label to the lateral side of the insert die, said wraparound label can be sucked onto the lateral side of the insert die so that the insert die can carry both the bottom label and the wraparound label at the same time securely and undisplaceably in order to deposit them in the mould cavity of the moulding tool.

Moreover, in an advantageous embodiment provision can be made such that in order to deposit the bottom label on the bottom of the mould cavity of the moulding tool and to turn down its peripheral region from the circumferential portion of the end side of the insert die onto the bottom of the mould cavity, the suction pressure is discontinuous or the bottom label is exposed to positive pressure, in particular slight positive pressure, at least on the circumferential portion of the end side of the insert die, in particular both on the circumferential portion and on the central portion of the end side of the insert die. Accordingly, in order to deposit the wraparound label on the lateral surface of the mould cavity of the moulding tool the suction pressure can preferably also be interrupted or the wraparound label can additionally be exposed to positive pressure, in particular slight positive pressure, in order to enable problem-free detachment of the labels from the insert die and depositing of the same at the intended position in the mould cavity of the moulding tool.

Alternatively or in addition to the latterly specified embodiment, provision can preferably be made, moreover, such that in order to deposit the bottom label on the bottom of the mould cavity of the moulding tool and to turn down its peripheral region from the circumferential portion of the end side of the insert die onto the bottom of the mould cavity, and/or in order to deposit the wraparound label on the lateral surface of the mould cavity of the moulding tool, the bottom label and/or the wraparound label is or are sucked onto the wall of the mould cavity of the moulding tool or is or are drawn electrostatically onto the wall of the mould cavity of the moulding tool. This can be advantageous, not only for the purpose of correct and precise transfer of the labels from the insert die to the mould cavity of the moulding tool, but also with regard to holding of the label or labels precisely in position and without slipping while injecting the plasticized plastic into the mould cavity of the moulding tool, during which the sucking or the electrostatic drawing of the label or labels onto the wall of the moulding tool delimiting the mould cavity in particular can be maintained. In the first-specified case the moulding tool can be equipped with negative pressure openings opening out into its mould chamber; in the latterly-specified case, the respective label, e.g. before applying to the insert die or in particular in the state already applied to the insert die, can be electrostatically charged and/or it is electrostatically charged in the mould cavity of the moulding tool so that, as a result of the electric potential difference it is "adhered" to the wall(s) of the moulding tool delimiting the mould chamber.

From a technical point of view, provision can consequently be made in an advantageous embodiment such that at least the circumferential portion of the end side of the insert die, in particular both the circumferential portion and the central portion of the end side of the insert die, and/or the lateral side of the insert die is/are provided with suction openings which can be connected to a negative pressure generator. In this connection e.g. the suction openings of the end side of the insert die or the suction openings of the lateral side of the insert die can open out into a common or into a respective suction channel of the insert die which can be (respectively) connected to the negative pressure generator.

In this connection the negative pressure generated by the negative pressure generator can advantageously be switched on or off in order to be able to detach the label or labels without any problem from the insert die and to deposit it or them in the mould cavity of the moulding tool. Moreover, the negative pressure generator can also be designed in particular to generate a positive pressure that can likewise be switched on or off so that the label or labels can be reliably detached from the insert die upon depositing them in the mould cavity of the moulding tool.

While basically any geometric configuration of the suction openings is possible, it may also prove to be advantageous if at least some suction openings extend substantially in slot form over at least part of the circumferential portion of the end side of the insert die from the central portion of the end side of the insert die with the radial extension direction component on the outside so that the circumferential region of the bottom label rests correctly against the circumferential portion of the end side of the insert die towards the top if the bottom label is applied to the end side of the insert die and both labels are transferred into the mould cavity of the moulding tool.

Moreover, it may be advantageous if at least one bottom label, in particular both a bottom label and a wraparound label, made of a flexibly elastic material is or are used. This configuration may be particularly advantageous for the bottom label, the circumferential side peripheral region of which, due to its elastic resilience, automatically turns downwards into an approximately planar extension in the direction of the bottom of the mould cavity of the moulding tool if it is detached from the end side of the insert die on the circumferential portion of which it has previously been bent upwards by elastic deformation, and is deposited into the mould cavity of the moulding tool.

Figure 5:
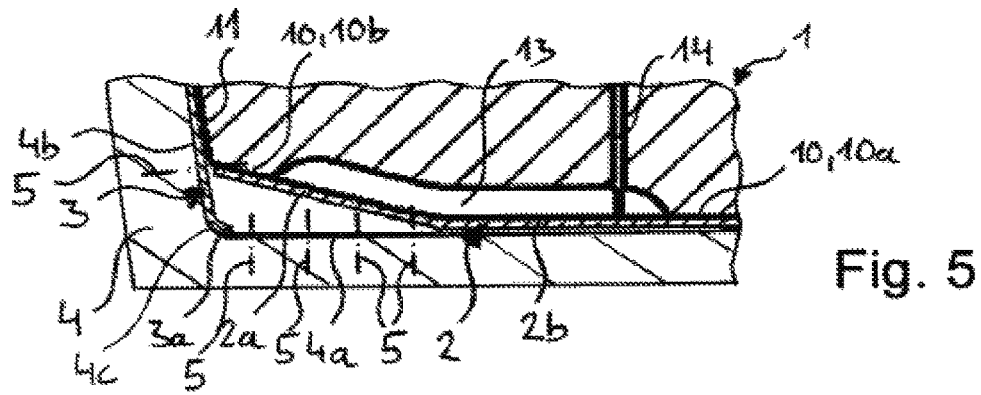
Figure 6:
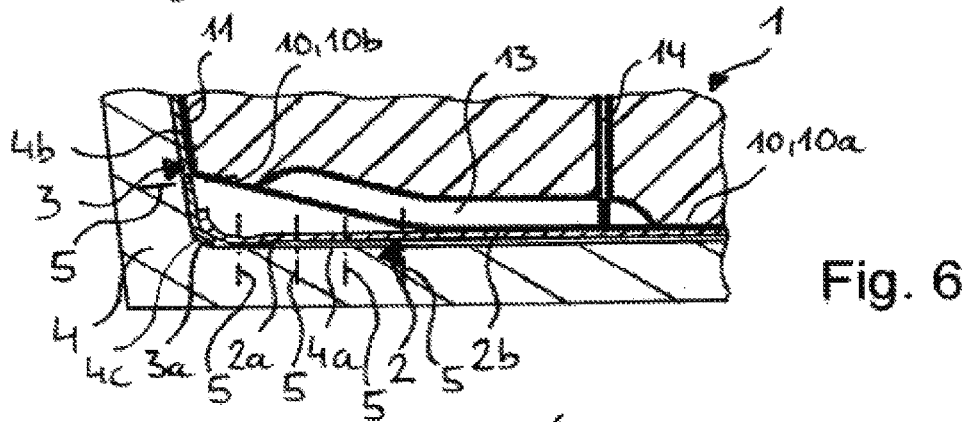
Figure 7:
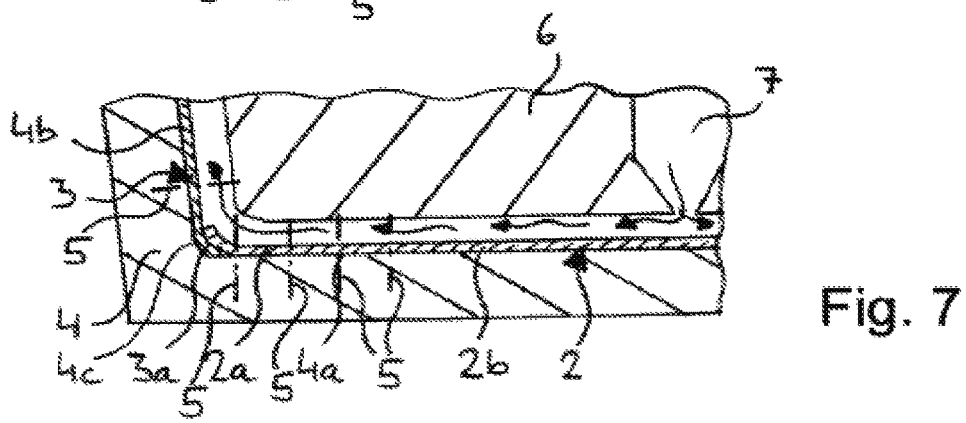

Additional features and advantages of the invention emerge from the following description of an exemplary embodiment with reference to the drawings. These show as follows:

FIG. 1 a diagrammatic side view of an embodiment of an insert die according to the invention;

FIG. 2 a diagrammatic top view of the lower end side in FIG. 1 of the insert die according to FIG. 1;

FIG. 3 a diagrammatic sectional view of the insert die according to FIGS. 1 and 2 along sectional plane A-A of FIG. 2;

FIG. 4 a diagrammatic detailed view of the insert die according to FIGS. 1 to 3 in the region of the cross-over of its end side and its lateral side which have been provided with a bottom label and a wraparound label;

FIG. 5 a detailed view of the insert die corresponding to FIG. 4 after this die has been introduced into the mould cavity of a moulding tool;

FIG. 6 a detailed view of the insert die corresponding to either of FIGS. 4 and 5 immediately after depositing the bottom label and the wraparound label in the mould cavity of the moulding tool such as to overlap one another peripherally; and FIG. 7 a detailed view of the moulding tool corresponding to FIG. 5 after the insert die has been brought out of the moulding tool and the bottom label and the wraparound label deposited in its mould cavity are back-moulded with a plasticized plastic material injected via a mould core.

In FIGS. 1 to 3 diagrammatic views of an embodiment, provided as a whole with reference number 1, of an insert die of a device according to the invention for producing an injection-moulded part provided with a bottom label 2 (see FIGS. 4 to 7) and with a wraparound label 3 (see also FIGS. 4 to 7) in the form of a container, such as a cup, are reproduced. The device that works according to the "In Mould Labeling" method further comprises a moulding tool 4 that is not shown in FIGS. 1 to 3 (see once again FIGS. 4 to 7), an injection-moulding machine assigned to the moulding tool 4, a magazine in each case for storage of the bottom 2 and wraparound labels 3 (see FIGS. 4 to 7), as well as appropriate transfer devices for transferring the labels 2, 3 from the respective magazines to the insert die 1. The injection-moulding machine, the magazines and the transfer devices are not shown in the drawings and are formed according to the prior art, for which reason they do not require any further discussion. It goes without saying that the device can also comprise, for example, a number of moulding tools 4 and a number of insert dies 1 that can be inserted into the latter and which can, e.g. be actuated synchronously in order to be able to produce moulded parts provided with a bottom label 2 and a wraparound label 3 at the same time.

As can be seen from FIGS. 1 to 3, the insert die 1 has an end side 10 provided for the application of the bottom label 2 (FIGS. 4 to 7) and a lateral side 11 provided for the application of the wraparound label 3 (FIGS. 4 to 7). Here the end side 10 of the insert die 1 has a central portion 10a and a circumferential portion 10b adjoining the latter radially on the outside, the central portion 10a protruding further in the direction of the free end of the insert die 1 (downwardly in FIGS. 1 and 3) in the axial direction of the latter than the circumferential portion 10b which recedes with respect to the latter such that the cross-section of the insert die 1 narrows (downwardly in FIGS. 1 and 3) in the direction of the free end in the circumferential portion 10b of its end side 10. In the present exemplary embodiment the central portion 10a of the end side 10 of the insert die 1 is, for example, substantially planar in form and extends perpendicular to the longitudinal axis A of the insert die 1 so that it is formed to approximately complement the bottom 4a —which is also approximately planar here —of the mould cavity of the moulding tool 4 (FIGS. 4 to 7). However, the circumferential portion 10b of the end side 10 of the insert die 1 narrows approximately conically, it in fact also being basically possible instead for it to be formed in some other way, e.g. convexly curved (not shown). The angle a between the plane spanning the central portion 10a and a straight line intersecting the longitudinal axis A and running parallel to the circumferential portion 10b is in the present case for example approximately 10° to approximately 20° , such as e.g. approximately 15° (see FIG. 1). Overall, the circumferential portion 10b preferably extends over at least 20%, preferably over at least 30%, in particular over approximately 40% to e.g. approximately 70% of the end side 10 of the insert die (see in particular FIG. 2). In the present exemplary embodiment the lateral side 11 of the insert die 1 is approximately cylindrical to slightly conical in form, in particular it being possible for it to be formed so as to complement the lateral surface 4b of the moulding tool 4 which on its part extends slightly conically (FIGS. 4 to 7).

As can be seen, furthermore, from FIGS. 1 to 3, the lateral side 11 of the insert die 1 is equipped with a plurality of suction openings 12 which extend, for example, in the form of slots or oblong holes around the circumference of the lateral side 11 (see FIG. 1) and serve to suck on the wraparound label 3 (FIGS. 4 to 7). Moreover, the edge side 10 of the insert die is provided with a plurality of suction openings 13 which extend both over the central portion 10a and in particular over the circumferential portion 10b of the edge side 10 of the insert die 1 (see in particular FIGS. 2 and 3) and serve to suck on the bottom label 2 (FIGS. 4 to 7). In the exemplary embodiment reproduced by the drawings, the suction openings 13 extend approximately in the radial direction of the end side 10 of the insert die 1 both over its central portion 10a and over the circumferential portion 10b in order to apply the bottom label 2 as far as possible with its entire circumferential region to the circumferential portion 10b of the end side 10 of the insert die 1 by bending or turning down the latter, and in this way to prevent a collision with the wraparound label 3 applied to the lateral side 11 of the insert die 1 if the wraparound label has been applied to the insert die 1. As is evident from FIGS. 2 and 3, the suction openings 12, 13 are fluidically connected by supply channels 14 running within the insert die 1, which supply channels open out, for example, into one or more common supply channels 15 (FIG. 3), to the outer end 16 of which a negative pressure generator (not shown) can be connected. The supply channel 15 or a line (not shown) connecting the latter to the negative pressure generator is advantageously equipped with a control valve (likewise not shown) in order to expose the suction openings 12, 13 optionally to negative pressure (if the labels 2, 3 are to be applied to the insert die 1) or not (if the labels 2, 3 are to be deposited in the mould cavity of the moulding tool 4).

Moreover, the negative pressure generator can e.g. optionally also be designed to generate an at least slightly positive pressure in order to facilitate detachment of the labels 2, 3 when they are deposited in the mould cavity of the moulding tool 4.

In the following an embodiment of a method according to the invention for transferring both the bottom label 2 and the wraparound label 3 by means of the insert die according to FIGS. 1 to 3 into the moulding tool 4 formed in the manner of an injection mould in order to produce an injection-moulded part provided with both of the labels 2, 3, in the present case in the form e.g. of a cup-shaped container, will be explained in more detail with reference to FIGS. 4 to 7. The components of the insert die 1 are provided with the same reference numbers in FIGS. 4 to 7 and will not be described again below. It should be pointed out that FIGS. 4 to 7 are not true to scale, and in particular the thickness of the bottom label 2 and the wraparound label 3 are shown larger than is generally the case in reality for the purpose of better illustration.

FIG. 4 shows the situation after both the bottom label 2 and the wraparound label 3 have been applied to the insert die 1 by these labels being removed, e.g. by means of appropriate handling devices (not shown), from a respective magazine (not shown either) and have been sucked onto the surfaces of the end side 10 and the lateral side 11 of the insert die 1 by means of the suction openings 12, 13. As can be seen from FIG. 4, the bottom label 2 here is applied substantially to the entire end side 10 of the insert die 1, i.e. both to its central portion 10a and to the respectively receding circumferential portion 10b, the peripheral region 2a of the bottom label 2 being bent upwards in FIG. 4 so that it rests substantially against the circumferential portion 10b of the insert die 1. In fact, the latter also applies to the central region 2b of the bottom label 2 which rests against the central portion 10a of the end side 10 of the insert die 1. The wraparound label 3 is applied to the lateral side 11 of the insert die 1, and such that its lower, free end 3a in FIG. 4, which points in the direction of the end side 10 of the insert die 1 or in the direction of its free (lower) end, projects over the lateral side 11 of the insert die 1 (downwards in FIG. 4). As a result, a collision of the bottom label 2 with the wraparound label 3 is reliably avoided. The distance L by which the wraparound label 3 projects (downwards) from the lateral side 11 of the insert die 1 or projects over the lateral side 11 corresponds at least to or is preferably approximately more than the axial offset V between the central portion 10a of the end side 10 of the insert die 1 protruding the furthest in the axial direction (i.e. vertically in FIG. 1) in the direction of the free end of the insert die 1 and the outer circumference 10c of the circumferential portion 10b of the end side 10 of the insert die 1 to which its lateral side 11 adjoins in the circumferential portion 10b of the end side 10 of the insert die 1.

FIG. 5 shows the situation in which the insert die equipped with the bottom label 2 and with the wraparound label 3 according to FIG. 4 has been introduced into the mould cavity of the moulding tool 4 and has reached its final position in which the labels 2, 3 are to be deposited in the mould chamber, but by maintaining the negative pressure acting via the suction openings 12, 13 are still (just) held on the end side 10 or the lateral side 11 of the insert die 1. As can be seen from FIG. 5, the central region 2b of the bottom label 2 rests substantially against the bottom 4a of the mould cavity of the moulding tool 4, while its peripheral region 2a, bent upwards, (still) rests against the receding circumferential portion 10b of the end side 10 of the insert die. The wraparound label 3 is likewise substantially in contact with the lateral surface 4a of the mould cavity of the moulding tool 4, the lower end 3a of the wraparound label 3 facing the bottom 4a in FIG. 5 projecting at least into the cross-over region of the lateral surface 4b into the bottom 4a of the mould cavity of the moulding tool 4 or —depending on the pre-set desired protrusion —e.g. also into at least the outer circumferential region of the bottom 4a due to its protrusion over the lateral side 11 of the insert die 1. Its free end 3a can have been bent inwardly here according to the cross-over 4c of the lateral surface 4b into the bottom 4a of the mould cavity of the moulding tool, for which reason this cross-over 4c preferably extends approximately consistently, and in particular can be rounded, e.g. forming a radius of preferably approximately 1 mm to approximately 5 mm.

FIG. 6 shows the situation in which the bottom label 2 and the wraparound label 3 have (just) been detached from the insert die 1 and have been deposited in the mould cavity of the moulding tool 4, which can take place one after the other or in particular simultaneously, by the suction channels 12, 13, being separated from the negative pressure generator, e.g. by closing the control valve, and as a result the negative or suction pressure being interrupted. As can be seen from FIG. 6, the peripheral region 2a of the bottom label 2 is turned down here from the circumferential portion 10b of the end side 10 of the insert die 1 (see FIGS. 4 and 5) onto the bottom 4a of the mould cavity of the moulding tool 4 (downwards in FIG. 6) so that it overlaps the edge of the wraparound label 3 facing it on the inside, and as a result the lower end 3a in FIG. 6 of the wraparound label 3 is located between the moulding tool 4 and the outer edge portion of the bottom label 2 so that the formation of a gap between the bottom label 2 and the wraparound label 3 in the finished moulded part is reliably avoided. The "turning down" of the peripheral region 2a of the bottom label 2 from the receding circumferential portion 10b of the end side 10 of the insert die 1 onto the bottom 4a of the mould cavity of the moulding tool 4 such as to overlap at least the end 3a of the wraparound label 2 can take place here in an approximately planar extension purely as a result of the elastic resilience of the material of the bottom label 2, for which reason the bottom label 2 —and optionally also the wraparound label 3 —is preferably produced from a flexibly elastic material, for example from a ready-printed plastic film with a higher melting point than that of the plasticized plastic material injected into the moulding tool 4 (see with regard to this below with reference to FIG. 7).

Alternatively, or in particular in addition, provision can however preferably be made for this purpose such that the moulding tool 4 on its part has a plurality of negative pressure openings opening out into the mould cavity, which are only indicated diagrammatically in FIGS. 5 to 7 by reference number 5, and at least some of which are disposed in the peripheral circumferential region of the bottom 4 which communicates with the receding circumferential portion 10b of the end side 10 of the insert die 1 when the latter has been introduced into the mould cavity of the moulding tool 4. However, the negative pressure openings 5 can advantageously be arranged both on the bottom 4a and on the lateral surface 4b of the mould cavity of the moulding tool 4 in order to keep both the bottom label 2 and the wraparound label 3 in the precise position when they have been deposited in the mould cavity of the moulding tool 4 and are back-moulded with the plasticized plastic material, the negative pressure also being able to be maintained in particular during the back-moulding. Instead of sucking the labels 2, 3 onto the walls of the mould cavity of the moulding tool 4, it is of course also conceivable to draw the labels 2, 3 onto the walls electrostatically (not shown).

Finally, FIG. 7 shows a situation in which the insert die 1 has been extracted from the mould cavity of the moulding tool 1 after the bottom label 2 and the wraparound label 3 have been deposited in the mould cavity overlapping one another peripherally. The arrangement of the labels 2, 3 corresponds to that of FIG. 6, the labels 2, 3 in particular being held in position at the negative pressure openings 5 by continuous application of negative pressure. As can be seen in FIG. 7, a mould core 6 which delimits the mould cavity at the side opposite the moulding tool 4 (the upper side in FIG. 7) has now been introduced into the mould cavity of the moulding tool. The mould core has a (or several; not shown) injection channel/s 7 which is connected to the injection-moulding machine (not shown) and by means of which the plasticized plastic material is injected into the mould cavity in order to produce the moulded part by back-moulding the bottom label 2 and the wraparound label 3. Provided, as is the case in the present exemplary embodiment, the injection channel 7 opens out into a central region of the bottom 4a of the mould cavity of the moulding tool 4 so that the flow paths of the injected molten plastic are of approximately equal length in all directions, the molten plastic is conveyed away over the bottom label 2 and the region where it overlaps the wraparound label 3 to the inside of the wraparound label 3, as indicated by the arrows according to FIG. 7. It can be seen that in this way the plasticized plastic material is reliably prevented from penetrating between the region where the bottom label 2 overlaps the wraparound label 3 and in particular the molten plastic is surely and reliably prevented from bleeding through to the outside of the labels 2, 3 so that a moulded part covered on all sides with the labels 2, 3 can be produced in which the cross-over between the labels 2, 3 cannot be seen and, moreover, the formation of wastage caused by this is avoided.

The invention claimed is:

1. A method for transferring a bottom label (2) and a wraparound label (3) into an injection mold (4) for producing an injection molded part provided with the bottom label (2) and with the wraparound label (3), in particular in the form of a container, in that the bottom label (2) is arranged on the end side (10) of an insert die (1) and the wraparound label (3) on the lateral side (11) of the insert die (1), and the insert die (1) equipped with both the bottom label (2) and with the wraparound label (3) is introduced into a mold cavity of a molding tool (4), after which the bottom label (2) is deposited on the bottom (4a) of the mold cavity of the molding tool (4) and the wraparound label (3) is deposited on the lateral surface (4b) of the mold cavity of the molding tool (4) in order to back-mold them with a plastics material, characterized by the following steps:

providing an insert die (1), the end side (10) of which has a central portion (l0a) and a circumferential portion (10b) adjoining the central portion (10a) radially on the outside, the central portion (10a) protruding further in the direction of the free end of the insert die (1) in the axial direction of the latter than the circumferential portion (10b), such that the cross-section of the insert die (1) narrows in the direction of its free end, at least in the circumferential portion (10b) of its end side (10); applying the bottom label (2) both to the central portion (10a) and to the circumferential portion (10b) of the end side (10) of the insert die (1) and applying the wraparound label (3) to the lateral side (11) of the insert die (1) such that the wraparound label (3) projects beyond the end, facing the end side (10) of the insert die (1), of the lateral side (11) of the insert die (1) in the direction of the free end thereof;

introducing the insert die (1) equipped with the bottom label (2) and with the wraparound label (3) into the mold cavity of the molding tool (4); detaching the wraparound label (3) from the lateral side (11) of the insert die (1) and applying the same at least to the lateral surface (4b) of the mold cavity of the molding tool (4);

detaching the bottom label (2) from the end side (10) of the insert die (1) and applying the same to the bottom (4a) of the mold cavity of the molding tool (4), the peripheral region (2a) of the bottom label (2) being turned down from the circumferential portion (10b) of the end side (10) of the insert die (1) onto the bottom (4a) of the mold cavity of the molding tool (4), such that it internally overlaps the edge (3a), facing it, of the wraparound label (3); and extracting the insert die (1) from the mold cavity of the molding tool (4).

2. The method according to claim 1, wherein the wraparound label (3) is applied to the lateral side (11) of the insert die (1) such that it projects over its lateral side (11) in the direction of the free end of the insert die (1) by a distance (L) that corresponds at least to the axial offset (V) between the central portion (10a) of the end side (10) of the insert die (1) protruding the furthest in the axial direction in the direction of the free end of the insert die (1) and the outer circumference (10c) of the circumferential portion (10b) of the end side (10) of the insert die (1) or at least slightly exceeds this axial offset (V).

3. The method according to claim 1, wherein the bottom label (2) is applied substantially to the entire end side (10) of the insert die (1), including its circumferential portion (10b).

4. The method according to claim 3, wherein in order to apply the bottom label (2) to the end side (10) of the insert die (1) said bottom label (2) is sucked by suction pressure at least onto the circumferential portion (10b) of the end side (10) of the insert die (1), in particular both onto the circumferential portion (10b) and onto the central portion (10a) of the end side (10) of the insert die (1); or in order to apply the wraparound label (3) to the lateral side (11) of the insert die (1), said wraparound label (3) is sucked by suction pressure onto the lateral side (11) of the insert die (1); or in order to apply the bottom label (2) to the end side (10) of the insert die (1) said bottom label (2) is sucked by suction pressure at least onto the circumferential portion (10b) of the end side (10) of the insert die (1), in particular both onto the circumferential portion (10b) and onto the central portion (10a) of the end side (10) of the insert die (1) and in order to apply the wraparound label (3) to the lateral side (11) of the insert die (1), said wraparound label (3) is sucked by suction pressure onto the lateral side (11) of the insert die (1.

5. The method according to claim 4, wherein in order to deposit the bottom label (2) on the bottom (4a) of the mold cavity of the molding tool (4) and to turn down its peripheral region (2a) from the circumferential portion (10b) of the end side (10) of the insert die (1) onto the bottom (4a) of the mold cavity, the suction pressure by means of which said bottom label (2) is sucked at least onto the circumferential portion (10b) of the end side (10) of the insert die (1) is interrupted or the bottom label (2) is exposed to positive pressure at least on the circumferential portion (10b) of the end side (10) of the insert die (1), in particular both on the circumferential portion (10b) and on the central portion (10a) of the end side (10) of the insert die (1); or in order to deposit the wraparound label (3) on the lateral surface (4b) of the mold cavity of the molding tool (4) the suction pressure by means of which said wraparound label (2) is sucked at least onto the lateral side (11) of the insert die (1) is interrupted or the wraparound label (3) is additionally exposed to positive pressure; or in order to deposit the bottom label (2) on the bottom (4a) of the mold cavity of the molding tool (4) and to turn down its peripheral region (2a) from the circumferential portion (10b) of the end side (10) of the insert die (1) onto the bottom (4a) of the mold cavity, the suction pressure by means of which said bottom label (2) is sucked at least onto the circumferential portion (10b) of the end side (10) of the insert die (1) is interrupted or the bottom label (2) is exposed to positive pressure at least on the circumferential portion (10b) of the end side (10) of the insert die (1), in particular both on the circumferential portion (10b) and on the central portion (10a) of the end side (10) of the insert die, and in order to deposit the wraparound label (3) on the lateral surface (4b) of the mold cavity of the molding tool (4) the suction pressure by means of which said wraparound label (2) is sucked at least onto the lateral side (11) of the insert die (1) is interrupted or the wraparound label (3) is additionally exposed to positive pressure.

6. The method according to claim 5, wherein in order to deposit the bottom label (2) on the bottom (4*a*) of the mold cavity of the molding tool (4) and to turn down its peripheral region (2*a*) from the circumferential portion (10*b*) of the end side (10) of the insert die (1) onto the bottom (4*a*) of the mold cavity, the bottom label (2) is sucked onto a wall of the mold cavity of the molding tool (4) or is or are drawn electrostatically onto the wall of the mold cavity of the molding tool; or
    in order to deposit the wraparound label (3) on the lateral surface (4*b*) of the mold cavity of the molding tool (4), the bottom label (2) is sucked onto the wall of the mold cavity of the molding tool (4) or is drawn electrostatically onto the wall of the mold cavity of the molding tool; or
    in order to deposit the bottom label (2) on the bottom (4*a*) of the mold cavity of the molding tool (4) and to turn down its peripheral region (2*a*) from the circumferential portion (10*b*) of the end side (10) of the insert die (1) onto the bottom (4*a*) of the mold cavity, the bottom label (2) is sucked onto a wall of the mold cavity of the molding tool (4) or is or are drawn electrostatically onto the wall of the mold cavity of the molding tool, and in order to deposit the wraparound label (3) on the lateral surface (4*b*) of the mold cavity of the molding tool (4), the bottom label (2) is sucked onto the wall of the mold cavity of the molding tool (4) or is drawn electrostatically onto the wall of the mold cavity of the molding tool.

7. The method according to claim 1, wherein at least one bottom label (2), in particular both a bottom label (2) and a wraparound label (3), is/are made of a flexibly elastic material.

8. A device for producing an injection molded part comprising a bottom label (2) and with a wraparound label (3), in particular in the form of a container, with a molding tool (4) with a mold cavity comprising a bottom (4*a*) and a lateral surface (4*b*) as well as with an insert die (1) that can be introduced into the mold cavity of the molding tool (4), which insert die has an end side (10) which is suitable for applying the bottom label (2) to the latter, and with a lateral side (11) which is suitable for applying the wraparound label (3) to the latter, in particular for implementing a method according to claim 1, wherein the end side (10) of the insert die (1) has a central portion (10*a*) and a circumferential portion (10*b*) adjoining the central portion (10*a*) radially on the outside, the central portion (10*a*) protruding further in the direction of the free end of the insert die (1) in the axial direction of the latter than the circumferential portion (10*b*) so that the cross-section of the insert die (1) narrows in the direction of its free end, at least in the circumferential portion (10*b*) of its end side (10).

9. The device according to claim 8, wherein the bottom (4*a*) of the mold cavity of the molding tool (4) has a substantially planar extension or is on its part made approximately in the form of a trough and has a circumferential region extending from a central region on the circumferential side obliquely upwards, but the axial distance between the lowest point of the central region of the bottom (4*a*) of the mold cavity (4) and the outer circumference of its circumferential region is smaller than the axial offset (V) between the central portion (10*a*) of the end side (10) of the insert die (1) protruding the furthest in the axial direction in the direction of the free end of the insert die (1) and the outer circumference (10*c*) of the circumferential portion (10*b*) of the end side (10) of the insert die (1).

10. The device according to claim 9, further comprising a cross-over (4*c*) between the lateral surface (4*b*) of the mold cavity of the molding tool (4) and its bottom (4*a*); wherein said cross-over (4*c*) is rounded, the rounding having in particular a radius of at least 1 mm, or preferably of at least 2 mm.

11. The device according to claim 8, wherein the insert die (1) has a substantially convexly curved end side (10) with a flowing cross-over of its central portion (10*a*) into its circumferential portion (10*b*).

12. The device according to claim 9, wherein the central region (10*a*) of the end side (10) of the insert die (10) is substantially planar in form, and the circumferential portion (10*b*) adjoining the latter radially on the outside is substantially conically narrowed or convexly curved.

13. The device according to claim 12, wherein at least the circumferential portion (10*b*) of the end side (10) of the insert die (1), in particular both the circumferential portion (10*b*) and the central portion (10*a*) of the end side (10) of the insert die (1), further comprises suction openings (13, 12) which can be connected to a negative pressure generator; or
    the lateral side (11) of the insert die (1) further comprises suction openings (13, 12) which can be connected to a negative pressure generator; or
    at least the circumferential portion (10*b*) of the end side (10) of the insert die (1), in particular both the circumferential portion (10*b*) and the central portion (10*a*) of the end side (10) of the insert die (1), and the lateral side (11) of the insert die (1) further comprises suction openings (13, 12) which can be connected to a negative pressure generator.

14. The device according to claim 13, wherein the negative pressure generated by the negative pressure generator can be switched on or off, and wherein the negative pressure generator can generate a positive pressure that can likewise be switched on or off.

15. The device according to claim 13, wherein the suction openings (13) extend substantially in slot form over at least part of the circumferential portion (10*b*) of the end side (10) of the insert die (1) from the central portion (10*a*) of the end side (10) of the insert die (1), with a radial extension direction component towards the outside.

\* \* \* \* \*

UNITED STATES PATENT AND TRADEMARK OFFICE
CERTIFICATE OF CORRECTION

PATENT NO. : 10,391,688 B2
APPLICATION NO. : 15/304407
DATED : August 27, 2019
INVENTOR(S) : Daniel Döbler Page 1 of 1

It is certified that error appears in the above-identified patent and that said Letters Patent is hereby corrected as shown below:

On the Title Page

Item (30), In the Foreign Application Priority Data:
Delete "10 2017 005 659" and replace it with – 10 2014 005 659.7 –

Signed and Sealed this
Twenty-fifth Day of February, 2020

Andrei Iancu
*Director of the United States Patent and Trademark Office*